(12) United States Patent
Kato et al.

(10) Patent No.: US 10,947,353 B2
(45) Date of Patent: Mar. 16, 2021

(54) RESIN COMPOSITION

(71) Applicant: Mitsubishi Chemical Corporation, Tokyo (JP)

(72) Inventors: Takeshi Kato, Mie (JP); Akira Ishikubo, Mie (JP); Yu Echigo, Kanagawa (JP); Mika Matsumoto, Kanagawa (JP); Jiro Sugiyama, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 135 days.

(21) Appl. No.: 16/145,603

(22) Filed: Sep. 28, 2018

(65) Prior Publication Data

US 2019/0031844 A1 Jan. 31, 2019

Related U.S. Application Data

(63) Continuation of application No. PCT/JP2017/010853, filed on Mar. 17, 2017.

(30) Foreign Application Priority Data

Apr. 1, 2016 (JP) .............................. JP2016-074346

(51) Int. Cl.
| | | |
|---|---|---|
| C08J 5/18 | (2006.01) |
| C08L 79/08 | (2006.01) |
| C08G 73/10 | (2006.01) |
| H01B 3/30 | (2006.01) |
| C08G 73/14 | (2006.01) |

(52) U.S. Cl.
CPC ............... *C08J 5/18* (2013.01); *C08G 73/10* (2013.01); *C08G 73/105* (2013.01); *C08G 73/1042* (2013.01); *C08G 73/1071* (2013.01); *C08G 73/14* (2013.01); *C08L 79/08* (2013.01); *H01B 3/30* (2013.01); *H01B 3/306* (2013.01); *C08J 2379/08* (2013.01); *C08J 2439/06* (2013.01); *C08J 2439/08* (2013.01)

(58) Field of Classification Search
CPC ............................ C08L 79/08; C08L 39/06–08
See application file for complete search history.

(56) References Cited

U.S. PATENT DOCUMENTS

| | | |
|---|---|---|
| 2009/0068403 A1 | 3/2009 | Yasuda et al. |
| 2011/0024156 A1 | 2/2011 | Ando et al. |
| 2016/0075916 A1 | 3/2016 | Kondo et al. |
| 2017/0306094 A1 | 10/2017 | Watanabe |

FOREIGN PATENT DOCUMENTS

| | | |
|---|---|---|
| CN | 105307861 A | 2/2016 |
| GB | 1 590 465 A | 6/1981 |
| GB | 1590464 A | 6/1981 |
| JP | S53-060953 A | 5/1978 |
| JP | H04-288377 A | 10/1992 |
| JP | 2007-023149 A | 2/2007 |
| JP | 2008-138039 A | 6/2008 |
| JP | 2009-067859 A | 4/2009 |
| JP | 2011-029100 A | 2/2011 |
| JP | 2015-130281 A | 7/2015 |
| JP | 2015-165015 A | 9/2015 |
| TW | 201612215 A | 4/2016 |
| TW | 201612243 A | 4/2016 |
| WO | 2005/068556 A1 | 7/2005 |

OTHER PUBLICATIONS

Extended European Search Report dated Mar. 20, 2019, issued in corresponding European Patent Application No. 17774421.6.
International Search Report (with partial translation) and Written Opinion dated Jun. 13, 2017, issued in corresponding International Patent Application No. PCT/JP2017/010853.
Office Action issued in corresponding Taiwanese Patent Application No. 106108933 dated Aug. 14, 2020.
Office Action issued in counterpart Chinese Application CN 201780021226.1 dated Aug. 28, 2019.
Office Action issued in corresponding Japanese Patent Application No. 2018-074857 dated Jan. 12, 2021.
Office Action issued in corresponding Korean Patent Application No. 10-2018-7028096 dated Jan. 12, 2021.

*Primary Examiner* — Ana L. Woodward
(74) *Attorney, Agent, or Firm* — Morgan, Lewis & Bockius LLP

(57) ABSTRACT

A resin composition for insulating coating material, comprises: a polyimide resin and/or a precursor thereof; and a polymer having a heterocyclic ring at a side chain, wherein the content of the polymer having a heterocyclic ring at a side chain is 0.1 to 7 parts by weight relative to 100 parts by weight of the polyimide resin and/or the precursor thereof. By adding a prescribed amount of the polymer having a heterocyclic ring at a side chain, there can be obtained a resin composition for insulating coating material still maintaining heat resistance and together having excellent bending resistance.

16 Claims, No Drawings

RESIN COMPOSITION

TECHNICAL FIELD

The present invention relates to a polyimide resin and/or its precursor composition having high heat resistance and having excellent bending resistance and also abrasion resistance and a metal coating material using the resin composition.

BACKGROUND ART

Heretofore, in the fields of electric and electronic parts, transporting devices, space and aircraft, and the like, polyimides that are excellent in electric insulating properties, abrasion resistance, chemical resistance, mechanical properties, and the like have been widely utilized. In an insulating film that is a representative use of a polyimide, with an improvement in performance of final products, higher performance is further required for an insulating resin. For example, in a flexible printed circuit board (FPC), with miniaturization of a device, not only thinning of the insulating film is required for thinning FPC but also high bending ability is required for housing it in a case of the device. Therefore, for the insulating film, there are required mechanical strength for achieving sufficient durability even when it is a thin film and flexibility for preventing breakage at the time of bending. For the insulating film in a display panel, there are required flexibility for thinning of the display and making the film flexible similar to the insulating film for FPC and also high mechanical strength for enduring the contact with a touch pen or the like. Furthermore, also in the insulating coating material of various electric wires for use in automobiles, there are required high heat resistance as power output of automobiles increases and high flexibility and mechanical strength for coping with high bending of the electric wires and friction of the electric wires each other resulting from an increase in wiring density.

For such problems, it has been studied to use a flexible polyamideimide resin as a coating material but there has not been obtained one that is satisfactory in all of heat resistance, abrasion resistance, and bending resistance (Patent Document 1).

In recent years, there has been developed an enamel wire using a polyimide resin that is more excellent in heat resistance than a polyamideimide resin, as a coating material (Patent Document 2). However, usually, since the polyimide resin is improved in heat resistance by making the molecular skeleton rigid, the abrasion resistance is enhanced by making the molecular skeleton rigid (to have high elastic modulus) but mobility of the molecule decreases and thus flexibility decreases, so that bending resistance becomes poor.

On the other hand, in the case where a flexible skeleton is introduced into a polyimide resin with considering elongation properties important, mechanical properties including heat resistance and elastic modulus remarkably decrease and hence the case cannot be applied to the use applications where mechanical strength is required.

PRIOR ART DOCUMENTS

Patent Documents

Patent Document 1: JP-A-4-288377
Patent Document 2: JP-A-2011-29100

SUMMARY OF THE INVENTION

Problems that the Invention is to Solve

The present invention intends to solve the above problems and an object of the invention is to provide a resin composition having high heat resistance and excellent bending resistance and abrasion resistance and a metal coating material using the resin composition.

Means for Solving the Problems

As a result of extensive studies for solving the above problems, the present inventors have found that a polyimide resin composition still maintaining heat resistance and together having excellent bending resistance can be obtained by adding a prescribed amount of a polymer having a heterocyclic ring at a side chain to a polyimide resin and/or a precursor thereof (the polyimide resin and the precursor thereof are sometimes collectively referred to as "polyimide resin and the like") and further, abrasion resistance can be enhanced by introducing a specific structure into a repeating unit of the polyimide resin and the like. Thus, they have accomplished the present invention.

That is, the gist of the present invention is as follows.

[1] A resin composition for insulating coating material, comprising: a polyimide resin and/or a precursor thereof; and a polymer having a heterocyclic ring at a side chain, wherein the content of the polymer having a heterocyclic ring at a side chain is 0.1 to 7 parts by weight relative to 100 parts by weight of the polyimide resin and/or the precursor thereof.

[2] The resin composition for insulating coating material according to the [1], wherein the polymer having a heterocyclic ring at a side chain is one or two or more selected from the group consisting of polyvinylpyrrolidone, polyvinylpyridine, and copolymers containing at least one of vinylpyrrolidone and vinylpyridine as a copolymerization component.

[3] The resin composition for insulating coating material according to the [1] or [2], wherein the glass transition temperature (Tg) of the polyimide resin and/or the precursor thereof is 250 to 400° C.

[4] The resin composition for insulating coating material according to any one of the [1] to [3], wherein the polyimide resin and/or the precursor thereof contains at least one of a structural unit represented by the following formula (1) and a structural unit represented by the following formula (2):

[Chem 1]

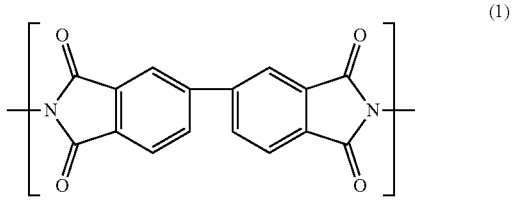

(1)

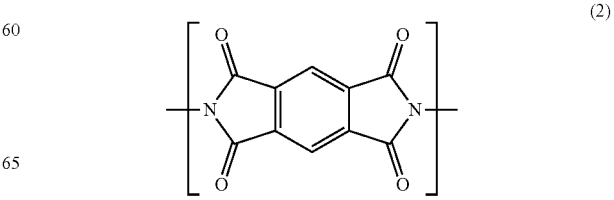

(2)

[5] The resin composition for insulating coating material according to any one of the [1] to [4], wherein the polyimide resin and/or the precursor thereof contains a structural unit represented by the following formula (3):

[Chem. 2]

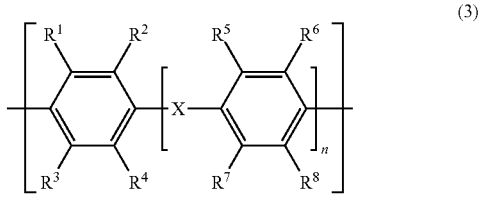

(3)

wherein $R^1$ to $R^8$ may be the same or different from one another and is a hydrogen atom, an alkyl group having 1 to 4 carbon atoms, a fluoroalkyl group having 1 to 4 carbon atoms, or a hydroxyl group; X is a direct bond, an oxygen atom, a sulfur atom, an alkylene group having 1 to 4 carbon atoms, a sulfonyl group, a sulfinyl group, a sulfide group, a carbonyl group, an amide group, an ester group, or a secondary amino group; and n is an integer of 0 to 4.

[6] The resin composition for insulating coating material according to any one of [1] to [5], wherein the polyimide resin and/or the precursor thereof contains a repeating unit containing a structure represented by the following formula (5) and a repeating unit containing at least one structure selected from the group consisting of —NH—, =NH, —C(O)NH—, —NHC(O)O—, —NHC(O)NH—, —NHC(S)NH—, —NH$_2$, —OH, —C(O)OH, —SH, —C(O)N(OH)—, —(O)S(O)—, —C(O)—, and —C(O)SH:

[Chem. 3]

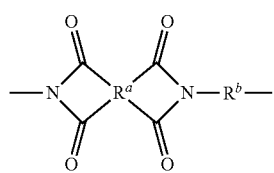

(5)

wherein $R^a$ represents a tetracarboxylic acid residue and $R^b$ represents a diamine residue.

[7] The resin composition for insulating coating material according to the [6], wherein the polyimide resin and/or the precursor thereof contains the repeating unit containing a structure represented by the following formula (5) and the repeating unit containing a —C(O)NH— structure.

[8] The resin composition for insulating coating material according to the [7], wherein the —C(O)NH— structure is a structure derived from 4,4'-diaminobenzanilide.

[9] The resin composition for insulating coating material according to any one of the [1] to [8], wherein the polyimide resin and/or the precursor thereof is blocked at the molecular end.

[10] A metal coating material comprising at least a resin layer containing the resin composition for insulating coating material according to any one of the [1] to [9].

[11] A resin composition comprising: a polyimide resin and/or a precursor thereof; and a polymer having a heterocyclic ring at a side chain, wherein the content of the polyimide resin and/or the precursor thereof is 30 to 80% by weight, and the content of the polymer having a heterocyclic ring at a side chain is 0.1 to 7 parts by weight relative to 100 parts by weight of the polyimide resin and/or the precursor thereof.

[12] The resin composition according to the [11], wherein the polymer having a heterocyclic ring at a side chain is one or two or more selected from the group consisting of polyvinylpyrrolidone, polyvinylpyridine, and copolymers containing at least one of vinylpyrrolidone and vinylpyridine as a copolymerization component.

[13] The resin composition for insulating coating material according to the [11] or [12], wherein the glass transition temperature (Tg) of the polyimide resin and/or the precursor thereof is 250 to 400° C.

[14] The resin composition for insulating coating material according to any one of the [11] to [13], wherein the polyimide resin and/or the precursor thereof contains at least one of a structural unit represented by the following formula (1) and a structural unit represented by the following formula (2):

[Chem. 4]

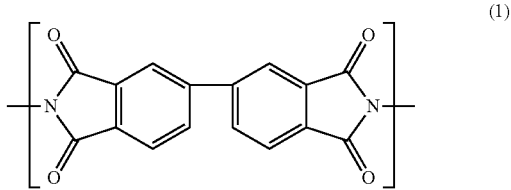

(1)

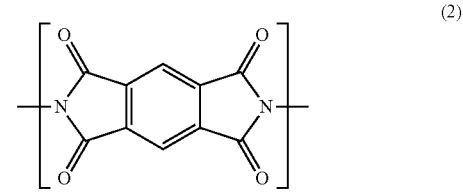

(2)

[15] The resin composition for insulating coating material according to any one of the [11] to [14], wherein the polyimide resin and/or the precursor thereof contains a structural unit represented by the following formula (3):

[Chem. 5]

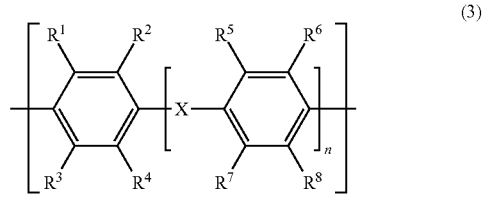

(3)

wherein $R^1$ to $R^8$ may be the same or different from one another and is a hydrogen atom, an alkyl group having 1 to 4 carbon atoms, a fluoroalkyl group having 1 to 4 carbon atoms, or a hydroxyl group; X is a direct bond, an oxygen atom, a sulfur atom, an alkylene group having 1 to 4 carbon atoms, a sulfonyl group, a sulfinyl group, a sulfide group, a carbonyl group, an ester group, or a secondary amino group; and n is an integer of 0 to 4.

[16] The resin composition for insulating coating material according to any one of the [11] to [15], wherein the polyimide resin and/or the precursor thereof contains a repeating unit containing a structure represented by the following formula (5) and a repeating unit containing at least one structure selected from the group consisting of —NH—, =NH, —C(O)NH—, —NHC(O)O—, —NHC(O)NH—, —NHC(S)NH—, —NH$_2$, —OH, —C(O)OH, —SH, —C(O)N(OH)—, —(O)S(O)—, —C(O)—, and —C(O)SH:

[Chem. 6]

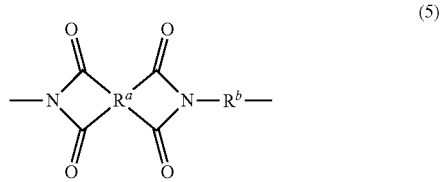

(5)

wherein $R^a$ represents a tetracarboxylic acid residue and $R^b$ represents a diamine residue.

[17] The resin composition for insulating coating material according to the [16], wherein the polyimide resin and/or the precursor thereof contains the repeating unit containing a structure represented by the following formula (5) and the repeating unit containing a —C(O)NH— structure.

[18] The resin composition for insulating coating material according to the [17], wherein the —C(O)NH— structure is a structure derived from 4,4'-diaminobenzanilide.

[19] The resin composition for insulating coating material according to any one of the [11] to [18], wherein the polyimide resin and/or the precursor thereof is blocked at the molecular end.

[20] A metal coating material comprising at least a resin layer containing the resin composition for insulating coating material according to any one of the [11] to [19].

Advantage of the Invention

According to the present invention, there are provided a polyimide resin and/or its precursor composition having high heat resistance and excellent bending resistance and abrasion resistance and a metal coating material using the composition.

MODES FOR CARRYING OUT THE INVENTION

The following will explain embodiments of the present invention in detail but the following explanation is an example of the embodiments of the invention and the invention is not limited to the following described contents unless it exceeds the gist thereof. Incidentally, in the case where an expression " . . . to . . . " is used herein, it is used as an expression that numerical values or physical property values before and after "to" are included.

The resin composition of the present invention relates to a resin composition for insulating coating material comprising a polyimide resin and/or a precursor thereof and a polymer having a heterocyclic ring at a side chain, which contains the polymer having a heterocyclic ring at a side chain in an amount of 0.1 to 7 parts by weight relative to 100 parts by weight of the polyimide resin and/or the precursor thereof (total amount thereof in case where the both are contained).

In addition, the resin composition of the invention relates to a resin composition comprising a polyimide resin and/or a precursor thereof and a polymer having a heterocyclic ring at a side chain, wherein the content of the polyimide resin and/or the precursor thereof (total amount thereof in case where the both are contained) is 30 to 80% by weight and which contains the polymer having a heterocyclic ring at a side chain in an amount of 0.1 to 7 parts by weight relative to 100 parts by weight of the polyimide resin and/or the precursor thereof (total amount thereof in case where the both are contained).

The polyimide varnish or polyamic acid varnish to be mentioned later is sometimes referred to as "resin composition of the invention". The resin composition of the invention specifically comprises the polyimide varnish or polyamic acid varnish to be mentioned later. Incidentally, the polyimide varnish may contain a polyamic acid (however, in an amount less than that of the polyimide) and the polyamic acid varnish may contain a polyimide (however, in an amount less than that of the polyamic acid).

Incidentally, in the invention, the weight-average molecular weight (Mw) of the polyimide or the polyamic acid is not particularly limited but is usually 1,000 or more, preferably 3,000 or more, and more preferably 5,000 or more, as weight-average molecular weight in terms of polystyrene. Also, it is usually 2,000,000 or less, preferably 1,800,000 or less, and more preferably 1,500,000 or less. By controlling it within the range, solubility in a solvent, viscosity of the composition, and the like tend to be easy to handle in a usual production facility, so that the case is preferred. Incidentally, the weight-average molecular weight in terms of polystyrene can be determined by gel permeation chromatography (GPC).

[Action Mechanism]

The reason is not clear why bending resistance (bending followability) can be improved while maintaining heat resistance of the polyimide resin and the like by blending a prescribed amount of the polymer having a heterocyclic ring at a side chain into the polyimide resin and the like. It is presumed that this is because the polymer having a heterocyclic ring at a side chain, such as polyvinylpyrrolidone, is prone to coordinate between the molecules of the polyimide resin and the like and strong intermolecular force between the polyimide molecules is weakened by the coordination thereof between the molecules of the polyimide resin and the like to improve the mobility of the polyimide molecules.

Incidentally, polyvinylpyrrolidone is used as a dispersibility-improving agent of a substance having high cohesive force such as carbon black or carbon nanotubes into a polyamic acid varnish or a polyimide varnish (for example, JP-A-2009-91500, WO2005-068556, JP-A-2015-72899). Therein, it is considered that the coordination of polyvinylpyrrolidone around carbon black or carbon nanotubes enhances dispersibility thereof to improve compatibility to the polyamic acid varnish or the polyimide varnish but the action and effect on the polyimide resin in the present invention is not suggested at all.

The action mechanism for the improvement in abrasion resistance in the present invention will be mentioned later.

[Polyimide Resin]

The polyimide resin can be usually obtained by obtaining a polyamic acid (polyimide precursor) using a tetracarboxylic dianhydride and a diamine compound as starting materials and subsequently imidizing the polyamic acid, but the polyimide resin can be directly produced by an imidization reaction from a tetracarboxylic dianhydride and a diamine compound.

As the tetracarboxylic dianhydride, there may be mentioned linear aliphatic tetracarboxylic dianhydrides, alicyclic tetracarboxylic dianhydrides, aromatic tetracarboxylic dianhydrides, and the like. One of these compounds may be used solely or two or more thereof may be used in any ratio and combination.

Examples of the linear aliphatic tetracarboxylic dianhydrides include ethylenetetracarboxylic dianhydride, butanetetracarboxylic dianhydride, meso-butane-1,2,3,4-tetracarboxylic dianhydride, and the like.

Examples of the alicyclic tetracarboxylic dianhydrides include 3,3',4,4'-biscyclohexanetetracarboxylic dianhydride, 1,2,3,4-cyclobutanetetracarboxylic dianhydride, 1,2,3,4-cyclopentanetetracarboxylic dianhydride, 1,2,4,5-cyclohexanetetracarboxylic dianhydride, 1,2,3,4-tetramethyl-1,2,3,4-cyclobutanetetracarboxylic dianhydride, 5-(2,5-dioxotetrahydrofuryl)-3-methyl-3-cyclohexene-11,2-dicarboxylic acid anhydride, tricyclo[6.4.0.0$^{2,7}$]dodecane-1,8:2,7-tetracarboxylic dianhydride, bicyclo[2.2.2]oct-7-ene-2,3,5,6-tetracarboxylic dianhydride, 4-(2,5-dioxotetrahydrofuran-3-yl)-1,2,3,4-tetrahydronaphthalene-1,2-dicarboxylic acid anhydride, 1,1'-bicyclohexane-3,3',4,4'-tetracarboxylic dianhydride, and the like.

Examples of the aromatic tetracarboxylic dianhydrides include pyromellitic dianhydride, 1,2,3,4-benzenetetracarboxylic dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 3,3',4,4'-biphenyltetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl) sulfone dianhydride, bis(3,4-dicarboxyphenyl) ether dianhydride, bis(2,3-dicarboxyphenyl) ether dianhydride, 3,3'4,4'-benzophenonetetracarboxylic dianhydride, 2,2'3,3'-benzophenonetetracarboxylic dianhydride, 4,4'-oxydiphthalic dianhydride, 4,4-(p-phenylenedioxy)diphthalic dianhydride, 4,4-(m-phenylenedioxy)diphthalic dianhydride, 2,2',6,6'-biphenyltetracarboxylic dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, 2,2'-bis(trifluoromethyl)-4,4',5,5'-biphenyltetracarboxylic dianhydride, 4,4'-(hexafluorotrimethylene)-diphthalic dianhydride, 4,4'-(octafluorotetramethylene)-diphthalic dianhydride, 4,4'-oxydiphthalic anhydride, 1,2,5,6-naphthalenedicarboxylic dianhydride, 1,4,5,8-naphthalenedicarboxylic dianhydride, 2,3,6,7-naphthalenedicarboxylic dianhydride, 3,4,9,10-perylene tetracarboxylic dianhydride, 2,3,6,7-anthracenetetracarboxylic dianhydride, 1,2,7,8-phenanthrenetetracarboxylic dianhydride, and the like.

As the diamine compounds, there may be mentioned aromatic diamine compounds, linear aliphatic diamine compounds, alicyclic diamine compounds, and the like. One of these compounds may be used solely or two or more thereof may be used in any ratio and combination.

Examples of the aromatic diamine compounds include 1,4-phenylenediamine, 1,2-phenylenediamine, 1,3-phenylenediamine, 4,4'-(biphenyl-2,5-diylbisoxy)bisaniline, 4,4'-diaminodiphenyl ether, 3,4'-diaminodiphenyl ether, 1,4-bis(4-aminophenoxy)benzene, 1,3-bis(4-aminophenoxy)benzene, 2,2-bis(4-(4-aminophenoxy)phenyl)propane, bis(4-(4-aminophenoxy)phenyl) sulfone, bis(4-(3-aminophenoxy)phenyl) sulfone, 1,3-bis(4-aminophenoxy) neopentane, 4,4'-diamino-3,3'-dimethylbiphenyl, 4,4'-diamino-2,2'-dimethylbiphenyl, 4,4'-bis(4-aminophenoxy)biphenyl, 4,4'-diamino-3,3'-dihydroxybiphenyl, bis(4-amino-3-carboxyphenyl)methane, 4,4'-diaminodiphenyl sulfone, 3,3'-diaminodiphenyl sulfone, 4,4'-diaminodiphenyl sulfide, N-(4-aminophenoxy)-4-aminobenzamine, 2,2'-bis(trifluoromethyl)-4,4'-diaminobiphenyl, bis(3-aminophenyl) sulfone, norbornanediamine, 4,4'-diamino-2-(trifluoromethyl)diphenyl ether, 5-trifluoromethyl-1,3-benzenediamine, 2,2-bis(4-(4-aminophenoxy)phenylhexafluoropropane, 4,4'-diamino-2,2'-bis(trifluoromethyl)biphenyl, 2,2-bis[4-{4-amino-2-(trifluoromethyl)phenoxy}phenyl]hexafluoropropane, 2-trifluoromethyl-p-phenylenediamine, 2,2-bis(3-amino-4-methylphenyl)hexafluoropropane, 4,4'-(9-fluorenylidene)diamine, 2,7-diaminofluorene, 1,5-diaminonaphthalene, 3,7-diamino-2,8-dimethyldibenzothiophene 5,5-dioxide, and the like.

Examples of the linear aliphatic diamine compounds include 1,2-ethylenediamine, 1,2-diaminopropane, 1,3-diaminopropane, 1,4-diaminobutane, 1,6-hexamethylenediamine, 1,5-diaminopentane, 1,10-diaminodecane, 1,2-diamino-2-methylpropane, 2,3-diamino-2,3-butanediamine, 2-methyl-1,5-diaminopentane, and the like.

Examples of the alicyclic diamine compounds include 1,3-bis(aminomethyl)cyclohexane, 1,4-bis(aminomethyl)cyclohexane, 1,4-diaminocyclohexane, 4,4'-methylenebis(cyclohexylamine), 4,4'-methylenebis(2-methylcyclohexylamine), and the like.

<Other Components>

For the production of the polyimide resin and the like, according to purposes, there may be further used a compound having an ethynyl group, a vinyl group, an allyl group, a cyano group, an isocyanate group, or the like (hereinafter sometimes referred to as "other monomer").

Preferable Embodiment 1

From the viewpoints of heat resistance and productivity, the polyimide resin and the like for use in the invention preferably has at least one of the structural unit represented by the following formula (1) and the structural unit represented by the following formula (2).

[Chem. 7]

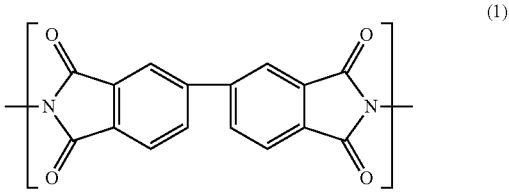
(1)

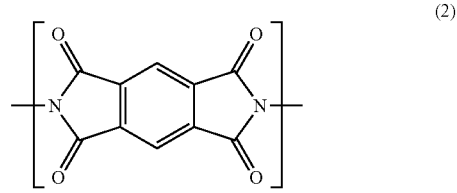
(2)

The structural units represented by the above formulae (1) and (2) may be derived from tetracarboxylic dianhydrides or may be derived from diamine compounds but are usually introduced into the polyimide resin and the like starting from tetracarboxylic dianhydrides. Therefore, the polyimide resin for use in the invention is preferably produced using at least pyromellitic dianhydride and/or 3,3',4,4'-biphenyltetracarboxylic dianhydride as starting tetracarboxylic dianhydride(s).

Moreover, from the viewpoint of heat resistance, the polyimide resin and the like for use in the invention preferably has a structural unit represented by the following formula (3).

[Chem. 8]

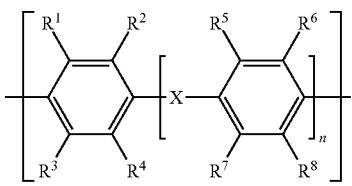

(3)

In the above formula (3), $R^1$ to $R^8$ may be the same or different from one another and are a hydrogen atom, an alkyl group having 1 to 4 carbon atoms, a fluoroalkyl group having 1 to 4 carbon atoms, or a hydroxyl group. Of these, a hydrogen atom or a methyl group is preferred.

In the above formula (3), X is a direct bond, an oxygen atom, a sulfur atom, an alkylene group having 1 to 4 carbon atoms, a sulfonyl group, a sulfinyl group, a sulfide group, a carbonyl group, an amide group, an ester group, or a secondary amino group. Of these, a direct bond, an oxygen atom, a sulfur atom, an alkylene group having 1 to 4 carbon atoms, a sulfonyl group, or an amide group is preferred and particularly, an oxygen atom is preferred.

In the above formula (3), n is an integer of 0 to 4. n is preferably an integer of 1 to 4.

Incidentally, $R^1$ to $R^8$, X, and n may be not necessarily the same in the structural unit represented by the formula (3) in the whole of one polyimide molecule. Particularly, in the case where n is an integer of 2 or more, X may be a structure different from each other.

Among the structural units represented by the formula (3), preferred is one represented by any of the structural units represented by the following formulae (3-1) to (3-6). Incidentally, in one polyimide molecule, only one of these structural units may be contained or a plurality thereof may be contained in combination.

[Chem. 9]

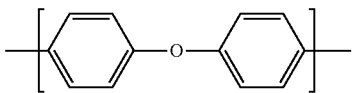

(3-1)

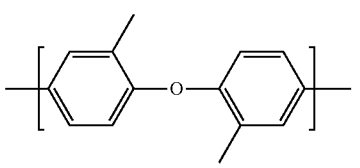

(3-2)

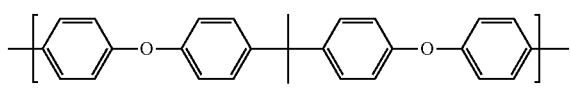

(3-3)

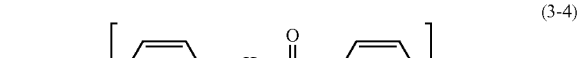

(3-4)

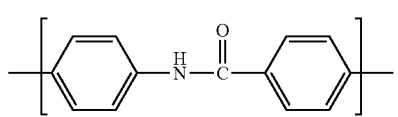

(3-5)

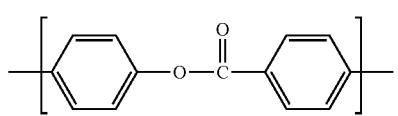

(3-6)

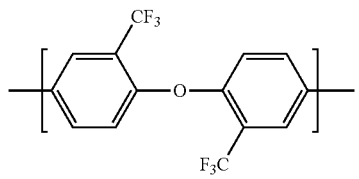

The structural unit represented by the above formula (3) may be derived from the tetracarboxylic dianhydride or may be derived from the diamine compound but is usually introduced into the polyimide resin starting from the diamine compound.

Therefore, the polyimide resin and the like for use in the invention is preferably produced using at least a diamine compound represented by the following formula (4) as a diamine compound.

[Chem. 10]

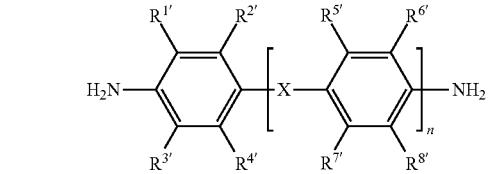

(4)

In the above formula (4), $R^{1'}$ to $R^{8'}$ are defined similarly to $R^1$ to $R^8$ in the above formula (3) and X' is defined similarly to X. Also, n' is defined similarly to n.

Examples of the diamine compound represented by the above formula (4) include 4,4'-diaminodiphenyl ether, 2,2'-dimethyl-4,4'-diaminobiphenyl, 1,4-bis(4-aminophenoxy)benzene, 2,2-bis(4-(4-aminophenoxy)phenyl)propane, 2,2-bis(4-(4-aminophenoxy)phenyl)hexafluoropropane, 2,2-bis[4-(4-aminophenoxy)phenyl]propane, 4,4'-bis(4-aminophenoxy)biphenyl, 2,2'-bis(trifluoromethyl)-4,4'-diaminobiphenyl, 4,4'-diaminobenzoylanilide, 4-aminophenyl-4-aminobenzoate, bis(4-aminophenyl) terephthalate, bis(4-(4-aminophenoxy)phenyl) sulfone, bis(4-amino-3-carboxyphenyl)methane, and the like. Of these, preferred are 4,4'-diaminodiphenyl ether, 2,2'-dimethyl-4,4'-diaminobiphenyl, 2,2'-bis(trifluoromethyl)-4,4'-diaminobiphenyl, and the like.

The polyimide resin and the like for use in the invention may have a structural unit other than the structural unit represented by the above formula (1) or (2) and the structural unit represented by the above formula (3). However, for obtaining the aforementioned effect resulting from the structural unit represented by the above formula (1) or (2) and the structural unit represented by the above formula (3), it is preferred to contain 80% by mol or more, especially 90 to 100% by mol of the structural unit represented by the above formula (1) or (2) in the total structural units derived from the tetracarboxylic dianhydride(s) constituting the polyimide resin and the like and 80% by mol or more, especially 90 to 100% by mol of the structural unit represented by the above formula (3) in the total structural units derived from the diamine compound(s) constituting the polyimide resin and the like.

Preferable Embodiment 2

From the viewpoints of heat resistance, abrasion resistance, and bending resistance, the polyimide resin and the like for use in the invention preferably have a repeating unit containing a structure represented by the following formula (5) and a repeating unit containing at least one structure selected from the group consisting of —NH— (imino bond; sometimes referred to as imino group), =NH (imino group), —C(O)NH— (amide bond; sometimes referred to as amide group), —NHC(O)O— (urethane bond; sometimes referred to as urethane group), —NHC(O)NH— (urea bond; sometimes referred to as urea group), —NHC(S)NH— (thiourea bond; sometimes referred to as thiourea group), —NH$_2$ (amino group), —OH (hydroxyl group), —C(O)OH (carboxyl group), —SH (thiol group), —C(O)N(OH)— (hydroxyamide group), —(O)S(O)— (sulfonyl group), —C(O)— (carbonyl group), and —C(O)SH (thiocarboxyl group) (hereinafter, these structures are sometimes referred to as "hydrogen bond-forming structure").

[Chem. 11]

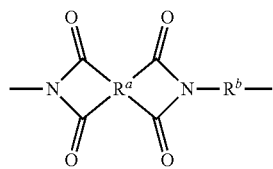

(5)

wherein $R^a$ represents a tetracarboxylic acid residue (i.e., a structural unit derived from a tetracarboxylic dianhydride) and $R^b$ represents a diamine residue (i.e., a structural unit derived from a diamine compound).

The reason is as follows.

It is known that an elastic modulus increases when molecular chains are linked with a chemical bond. The chemical bond includes a covalent bond and a non-covalent bond. In the case where the molecular chains are linked with the covalent bond, the elastic modulus increases (i.e., abrasion resistance is improved) but mechanical flexibility (elongation) decreases. That is, bending resistance decreases. Usually, when a polyimide resin or a polyamic acid is baked at a prescribed temperature or higher, since the end of the molecule reacts with another molecule or a specific site or the like in the molecule to form a covalent bond, flexibility decreases. However, when the molecule has a repeating unit containing a structure that forms a non-covalent bond, a non-covalent bond (hereinafter sometimes simply referred to as "non-covalent bond") is formed between molecules and/or with a specific site or the like in the molecule and a proper elastic modulus is exhibited due to intermolecular interaction, so that both of abrasion resistance and bending resistance can be achieved.

As the non-covalent bond, there may be mentioned an ionic bond, a π-π stacking, a hydrogen bond, and the like. Since heat resistance of the polyimide resin and the like increases and mechanical properties become excellent, a hydrogen bond is preferred. In the preferable embodiment 2 of the invention, as a structure that forms a hydrogen bond, the aforementioned hydrogen bond-forming structure that is especially excellent in the effect is introduced into the polyimide resin and the like.

Among the above hydrogen bond-forming structures, especially —C(O)NH— (amide bond), —NHC(O)NH— (urea bond), and —OH (hydroxyl group) are preferred and particularly, —C(O)NH— (amide bond) is preferred, in view of excellence in the above introduction effect.

The content of the hydrogen bond-forming structure in the polyimide molecule is not particularly limited but, in the case of the polyamic acid, when the case where all the repeating units in the polyamic acid contain one hydrogen bond-forming structure is taken as 100%, the content is usually larger than 0%, preferably 2% or more, more preferably 5% or more and is usually less than 100%, preferably 75% or less, more preferably 50% or less. Also, in the case of the polyimide resin, when the case where all the repeating units contain one structure that forms a non-covalent bond is taken as 100%, the content is usually larger than 0%, preferably 2% or more, more preferably 5% or more and is usually less than 100%, preferably 75% or less, more preferably 50% or less. When the introduction amount is in the range, a polyimide resin having more satisfactory mechanical properties such as tensile modulus and elongation can be formed.

Incidentally, the content of the hydrogen bond-forming structure in the polyimide molecule can be usually determined by NMR, IR, Raman, titration, mass spectrometry, or the like.

As a method for introducing the hydrogen bond-forming structure into a repeating unit of the polyimide resin and the like, there may be mentioned a method of polymerizing a monomer having the hydrogen bond-forming structure at the time of producing the polyimide resin and the like and a method of forming the hydrogen bond-forming structure by a polymerization reaction. Particularly, preferred is a method of polymerization using a monomer having one or more kinds of the hydrogen bond-forming structure as a starting material for the production of the polyimide resin and the like.

As the monomer having one or more kinds of the hydrogen bond-forming structure (hereinafter sometimes referred to as "hydrogen bond-forming monomer"), there may be mentioned tetracarboxylic dianhydride and diamine compound having one or more kinds of the hydrogen bond-forming structure.

Specifically, as the tetracarboxylic dianhydride, 3,3',4,4'-benzophenonetetracarboxylic dianhydride and the like may be mentioned. Examples of the diamine compound include 4,4'-diaminobenzanilide, 4,4'-bis(4-aminobenzamide)-3,3'-dihydroxybiphenyl, 2,2'-bis(3-amino-4-hydroxyphenyl) sulfone, 2,2'-bis(3-amino-4-hydroxyphenyl)propane, 4,4'-diamino-3,3'-dihydroxybiphenyl, bis(4-amino-3-carboxyphenyl)methane, and the like. One of these hydrogen bond-forming monomers may be used solely or two or more thereof may be used in any ratio and combination.

Of these, particularly, it is preferred to use 4,4'-diaminobenzanilide in view of excellence in the introduction effect.

The introduction amount of the hydrogen bond-forming monomer is not particularly limited and, in the case of the polyamic acid, the amount is usually 0.5% by mol or more, preferably 5% by mol or more, more preferably 10% by mol or more and usually 50% by mol or less, preferably 40% by mol or less, more preferably 30% by mol or less in the whole repeating units of the polyamic acid. Moreover, also in the case of the polyimide resin, the amount is usually 0.5% by mol or more, preferably 5% by mol or more, more preferably 10% by mol or more and usually 50% by mol or less, preferably 40% by mol or less, more preferably 30% by mol or less in the whole repeating units of the polyimide resin. When the introduction amount of the hydrogen bond-forming monomer is in this range, a polyimide resin having both of high elastic modulus and high elongation degree is easily obtained. Hereinafter, the introduction amount of the hydrogen bond-forming monomer is referred to as "hydrogen bond-forming monomer introduction amount".

Preferable Embodiment 3

The polyimide resin of the invention is preferably blocked at the molecular end. When the molecular end is blocked, the formation of the covalent bond described in the paragraph of the aforementioned preferable embodiment 2 is suppressed and flexibility is maintained, so that bending resistance is further improved.

As a method for obtaining the polyimide resin blocked at the molecular end, there is a method of reacting a monofunctional compound as an end-blocking agent at the time of producing the polyamic acid and the polyimide resin. Such an end-blocking agent is not particularly limited but examples thereof include acid anhydrides, amines, epoxys, isocyanates, alcohols, and the like. Of these, for maintaining reaction efficiency and heat resistance, an acid anhydride or an amine is preferred.

As the acid anhydrides, aromatic acid anhydrides, aliphatic acid anhydrides, and the like may be mentioned.

Examples of the aromatic anhydrides include phthalic anhydride, 2,3-naphthalenedicarboxylic anhydride, 1,2-naphthalenedicarboxylic anhydride, 4-methylphthalic anhydride, 3-methylphthalic anhydride, 4-chlorophthalic anhydride, 4-tert-butylphthalic anhydride, 4-fluorophthalic anhydride, and the like.

The aliphatic acid anhydrides include linear structure ones and cyclic structure ones and, as the aliphatic acid anhydrides having a linear structure, there may be mentioned butylsuccinic anhydride, decylsuccinic anhydride, n-octylsuccinic anhydride, dodecylsuccinic anhydride, (2-methyl-2-propyl)-succinic anhydride, 2-octylsuccinic anhydride, and the like.

Moreover, as the aliphatic acid anhydrides having a cyclic structure, there may be mentioned cis-1,2-cyclohexylcarboxylic anhydride, trans-1,2-cyclohexylcarboxylic anhydride, 4-methylcyclohexane-1,2-dicarboxylic anhydride, and the like.

Particularly, for maintaining mechanical properties and heat resistance, preferred is phthalic anhydride, 2,3-naphthalenedicarboxylic anhydride, 1,2-naphthalenedicarboxylic anhydride, 4-methylphthalic anhydride, or 3-methylphthalic anhydride.

As the amines, aromatic amines, aliphatic amines, and the like may be mentioned.

Examples of the aromatic amines include aniline, 1-naphthylamine, 1-aminoanthracene, 2-aminoanthracene, 9-aminoanthracene, N,N-dimethyl-1,4-phenylenediamine, 2-chloroaniline, 4-chloroaniline, 4-aminopyridine, cytosine, p-toluidine, 4-butylaniline, 4-(2-aminoethyl)pyridine, 4-amino-4-ethylpyridine, 4-amino-3-ethylpyridine, isonicotinamide, and the like.

The aliphatic amines include linear structure ones and cyclic structure ones and, as the aliphatic amines having a linear structure, there may be mentioned ethylamine, tert-butylamine, isopropylamine, isobutylamine, neopentylamine, propylamine, and the like.

As the aliphatic amines having a cyclic structure include cyclohexylamine, 4-methylcyclohexylamine, 3-methylcyclohexylamine, aminomethylcyclohexane, 4-(2-aminoethyl)cyclohexylamine, 4-butylcyclohexylamine, and the like.

For maintaining mechanical properties and heat resistance, preferred are phthalic anhydride, aniline, 4-aminopyridine, and 1-naphthylamine.

As the epoxys, there may be mentioned phenyl glycidyl ether, methylphenyl glycidyl ether, dimethylphenyl glycidyl ether, trimethylphenyl glycidyl ether, tetramethylphenyl glycidyl ether, ethylphenyl glycidyl ether, diethylphenyl glycidyl ether, triethylphenyl glycidyl ether, tetraethylphenyl glycidyl ether, isoproylphenyl glycidyl ether, diisopropylphenyl glycidyl ether, triisopropylphenyl glycidyl ether, tetraisopropylphenyl glycidyl ether, o-phenylphenol glycidyl ether, m-phenylphenol glycidyl ether, p-phenylphenol glycidyl ether, p-tertiary butylphenyl glycidyl ether, o-tertiary butylphenyl glycidyl ether, m-tertiary butylphenyl glycidyl ether, chlorophenyl glycidyl ether, dichlorophenyl glycidyl ether, trichlorophenyl glycidyl ether, tetrachlorophenyl glycidyl ether, bromophenyl glycidyl ether, dibromophenyl glycidyl ether, tribromophenyl glycidyl ether, tetrabromophenyl glycidyl ether, and the like.

As the isocyanates, there may be mentioned monofunctional isocyanate compounds such as n-butyl isocyanate, isopropyl isocyanate, phenyl isocyanate, and benzyl isocyanate, (meth)acryloyloxyalkyl isocyanates such as (meth)acryloyl isocyanate, 2-(meth)acryloyloxyethyl isocyanate, 3-(meth)acryloyloxypropyl isocyanate, 2-(meth)acryloyloxy-1-methylethyl isocyanate, and 2-(meth)acryloyloxy-2-methylethyl isocyanate, and the like.

As the alcohols, there may be mentioned monohydric alcohols such as methanol; ethanol; 1-propanol and 2-propanol, which have 3 carbon atoms; 1-butanol, 2-butanol, isobutanol, and t-butanol, which have 4 carbon atoms; 1-pentanol, 2-pentanol, 3-pentanol, 2-methyl-1-butanol, 3-methyl-1-butanol, 2-ethyl-1-propanol, and the like, which have 5 carbon atoms; 1-hexanol, 2-hexanol, 3-hexanol, 2-methyl-1-pentanol, 3-methyl-1-pentanol, 3-methyl-2-pentanol, 2-methyl-3-pentanol, 2-ethyl-1-butanol, 3-ethyl-2-butanol, 2,3-dimethyl-1-butanol, cyclohexanol, and the like, which have 6 carbon atoms; 1-heptanol, 2-heptanol, 3-heptanol, 4-heptanol, 2-methyl-1-hexanol, 2-methyl-3-hexanol, 2-methyl-4-hexanol, 3-methyl-1-hexanol, 3-methyl-2-hexanol, 3-methyl-4-hexanol, 2-ethyl-1-pentanol, 2-ethyl-3-pentanol, 2,2-dimethyl-1-pentanol, 2,3-dimethyl-1-pentanol, 2,4-dimethyl-1-pentanol, and the like, which have 7 carbon atoms; 1-octanol, 2-octanol, 3-octanol, 4-octanol, 2-methyl-1-heptanol, 2-methyl-3-heptanol, 2-methyl-4-heptanol, 2-ethyl-1-hexanol, 2-ethyl-3-hexanol, 2-ethyl-4-hexanol, 2-propyl-1-pentanol, 2-propyl-3-pentanol, 2-propyl-4-pentanol, 2,3-dimethyl-1-hexanol, 2,4-dimethyl-1-hexanol, and the like, which have 8 carbon atoms; 1-nonanol, 2-nonanol, 3-nonanol, 4-nonanol, 5-nonanol, 2-methyl-1-octanol, 2-methyl-3-octanol, 2-methyl-4-octanol, 2-methyl-5-octanol, 2-methyl-6-octanol, 2-ethyl-1-heptanol, 2-ethyl-3-heptanol, 2-ethyl-4-heptanol, 2-ethyl-5-heptanol, 2,6-dimethyl-1-heptanol, 2,6-dimethyl-4-heptanol, 3,5,5-trimethyl-1-hexanol, 3,5,5-trimethyl-2-hexanol, 2,2,4-trimethyl-1-hexanol, and the like, which have 9 carbon atoms; 1-decanol, 2-decanol, 3-decanol, 4-decanol, 5-decanol, 2-methyl-1-nonanol, 2-methyl-3-nonanol, 2-methyl-4-nonanol, 2-methyl-5-nonanol, 2-ethyl-1-octanol, 2-ethyl-3-octanol, 2-ethyl-4-octanol, 2-ethyl-5-octanol, and the like, which have 10 carbon atoms; 1-undecanol, 2-undecanol, 3-undecanol, 4-undecanol, 2-methyl-1-decanol, 2-ethyl-1-nonanol, 2-propyl-2-octanol, and the like, which have 11 carbon atoms; 1-dodecanol, 2-dodecanol, 3-dodecanol, 1-ethyl-1-decanol, 2-ethyl-1-decanol, 3-ethyl-1-decanol, 2-butyl-1-octanol, and the like, which have 12 carbon atoms; 1-tridecanol, 2-tridecanol, 3-tridecanol, 1-ethyl-1-undecanol, 2-ethyl-1-undecanol, 3-ethyl-1-undecanol, 2-butyl-1-nonanol, and the like, which have 13 carbon atoms; 1-tetradecanol, 2-tetradecanol, 3-tetradecanol, 2-methyl-1-tridecanol, 2-ethyl-1-dodecanol, 2-propyl-1-undecanol, and the like, which have 14 carbon atoms; 1-pentadecanol, 2-pentadecanol, 3-pentadecanol, 2-methyl-1-tetradecanol, 2-ethyl-1-tridecanol, 2-propyl-1-dodecanol, and the like, which have 15 carbon atoms; 1-hexadecanol, 2-hexadecanol, 3-hexadecanol, 2-methyl-1-pentadecanol, 2-ethyl-1-tetradecanol, 2-propyl-1-tridecanol, and the like, which have 16 carbon atoms; 1-heptadecanol, 2-heptadecanol, 3-heptadecanol, 2-methyl-1-hexadecanol, 2-ethyl-1-pentadecanol, 2-propyl-1-tetradecanol, and the like, which have 17 carbon atoms; 1-octadecanol, 2-octadecanol, 3-octadecanol, 2-methyl-1-heptadecanol, 2-ethyl-1-hexadecanol, 2-propyl-1-pentadecanol, and the like, which have 18 carbon atoms; 1-nonadecanol, 2-nonadecanol, 3-nonadecanol, 2-methyl-1-octadecanol, 2-ethyl-1-heptadecanol, 2-propyl-1-hexadecanol, and the like, which have 19 carbon atoms; and 1-eicosanol, 2-eicosanol, 3-eicosanol, 2-methyl-1-nonadecanol, 2-ethyl-1-octadecanol, 2-propyl-1-heptadecanol, and the like, which have 20 carbon atoms.

The blocking rate of the molecular end of the polyimide resin is preferably 30% or more, more preferably 50% or more, further preferably 80% or more and particularly preferably 90% or more and an upper limit thereof is 100%. Particularly, the end blocking rate of the polyimide resin is preferably 80% or more and 100% or less.

The end blocking rate of the polyimide resin can be usually determined by NMR, IR, Raman, titration, mass spectrometry, or the like.

Incidentally, the polyimide resin for use in the invention may be one satisfying only the requirement of the aforementioned preferable embodiment 1, may be one satisfying only the requirement of the preferable embodiment 2, may be one satisfying only the requirement of the preferable embodiment 3, may be one satisfying any two requirements of the preferable embodiments 1 to 3, or may be one satisfying all the requirements of the preferable embodiments 1 to 3.

<Production Method>

The production method of the polyimide resin is not particularly limited and conventionally known imidization methods can be used. For example, there may be mentioned a method of performing an imidization reaction of the aforementioned tetracarboxylic dianhydride and diamine compound through dehydration under heating or with a dehydration reagent in the presence of a reaction solvent, a method of obtaining a polyimide precursor (polyamic acid) through an amidization reaction of the tetracarboxylic dianhydride and diamine compound and subsequently performing an imidization reaction of the precursor through dehydration under heating or with a dehydration reagent, in the presence of a reaction solvent, and the like. When necessary amounts of the aforementioned hydrogen bond-forming monomer and the end-blocking agent are present in the reaction system, there can be produced a polyimide resin having a repeating unit containing the hydrogen bond-forming structure and a polyimide resin blocked at the molecular end. Furthermore, the reaction may be carried out in the presence of the aforementioned other monomer(s) in the reaction system.

Hereinafter, the tetracarboxylic dianhydride, the diamine compound, the hydrogen bond-forming monomer, the end-blocking agent, and the other monomer(s) are collectively referred to as "starting materials of the tetracarboxylic dianhydride, the diamine compound, and the like".

As the dehydration reagent, conventionally known reagents can be used and examples thereof include acid anhydrides such as acetic anhydride, propionic anhydride, benzoic anhydride, trifluoroacetic anhydride, and chloroacetic anhydride.

The method of reacting the starting materials of the tetracarboxylic dianhydride, the diamine compound, and the like in a solvent is not particularly limited. Moreover, the addition order and addition method of the starting materials of the tetracarboxylic dianhydride, the diamine compound, and the like are also not particularly limited. For example, a polyimide or polyamic acid can be obtained by charging the tetracarboxylic dianhydride and the diamine compound sequentially into a solvent and stirring them at an appropriate temperature.

The amount of the diamine compound is usually 0.7 mol or more, preferably 0.8 mol or more and usually 1.3 mol or less, preferably 1.2 mol or less relative to 1 mol of the tetracarboxylic dianhydride. When the amount of the diamine compound is controlled to such a range, a polyimide or polyamic acid having a high polymerization degree is obtained and film-forming properties and film-making properties tend to be improved.

The concentration of the starting materials of the tetracarboxylic dianhydride, the diamine compound, and the like in a solvent can be appropriately set according to reaction conditions and viscosity of the resulting polyimide precursor.

The total amount of the starting materials of the tetracarboxylic dianhydride, the diamine compound, and the like is not particularly limited but is usually 1% by weight or more, preferably 5% by weight or more and usually 70% by weight or less, preferably 50% by weight or less relative to the total amount of the solution containing the starting materials of the tetracarboxylic dianhydride, the diamine compound, and the like and the solvent. By performing the polymerization in the concentration range, a homogeneous polyimide varnish or polyamic acid varnish having a high polymerization degree can be obtained. In the case where the polymerization is performed at less than 1% by weight of the total concentration of the starting materials of the tetracarboxylic dianhydride, the diamine compound, and the like, the polymerization degree of the polyimide or polyamic acid do not become sufficiently high and the polyimide resin finally obtained becomes brittle in some cases. On the other hand, when the polymerization is performed in a concentration higher than 70% by weight, solution viscosity increases and stirring becomes difficult in some cases.

In the case where the polyimide resin is obtained in a solution, the temperature at which the starting materials of the tetracarboxylic dianhydride, the diamine compound, and the like are reacted in the solvent is not particularly limited as long as it is a temperature at which the reaction proceeds but is usually 20° C. or higher, preferably 40° C. or higher and usually 240° C. or lower, preferably 220° C. or lower.

The reaction time is usually 1 hour or more, preferably 2 hour or more and usually 100 hours or less, preferably 42 hours or less. By performing the reaction under such conditions, there is a tendency that the polyimide resin can be obtained at low costs in good yields.

The pressure at the reaction may be any of ordinary pressure, elevated pressure, and reduced pressure. The atmosphere may be under air or under an inert atmosphere but an inert atmosphere is preferred from the viewpoint of bending followability of the resulting polyimide resin, consequently the metal coating material of the invention.

In the case where the polyamic acid is obtained in a solution, the temperature at which the starting materials of the tetracarboxylic dianhydride, the diamine compound, and the like are reacted in the solvent is not particularly limited as long as it is a temperature at which the reaction proceeds but is usually 0° C. or higher, preferably 20° C. or higher and usually 120° C. or lower, preferably 100° C. or lower.

The reaction time is usually 1 hour or more, preferably 2 hour or more and usually 100 hours or less, preferably 42 hours or less. By performing the reaction under such conditions, there is a tendency that the polyamic acid can be obtained at low costs in good yields.

The pressure at the reaction may be any of ordinary pressure, elevated pressure, and reduced pressure. The atmosphere may be under air or under an inert atmosphere but an inert atmosphere is preferred from the viewpoint of bending followability of the resulting polyimide resin, consequently the metal coating material of the invention.

The solvent for use at the time of reacting the starting materials of the tetracarboxylic dianhydride, the diamine compound, and the like is not particularly limited and examples thereof include hydrocarbon-based solvents such as hexane, cyclohexane, heptane, benzene, naphtha, toluene, xylene, mesitylene, and anisole; halogenated hydrocarbon solvents such as carbon tetrachloride, methylene chloride, chloroform, 1,2-dichloroethane, chlorobenzene, dichlorobenzene, and fluorobenzene; ether-based solvents such as diethyl ether, tetrahydrofuran, 1,4-dioxane, and methoxybenzene; ketone-based solvents such as acetone, methyl ethyl ketone, cyclohexanone, and methyl isobutyl ketone; glycol-based solvents such as ethylene glycol monomethyl ether, ethylene glycol monoethyl ether, ethylene glycol dimethyl ether, diethylene glycol dimethyl ether, and propylene glycol monomethyl ether acetate; amide-based solvents such as N,N-dimethylformamide, N,N-dimethylacetamide, and N-methyl-2-pyrrolidone; sulfone-based solvents such as dimethyl sulfoxide; heterocycle-based solvents such as pyridine, picoline, lutidine, quinoline, and isoquinoline; phenol-based solvents such as phenol and cresol; lactone-based solvents such as γ-butyrolactone, γ-valerolactone, and δ-valerolactone; and the like. Of these, glycol-based solvents, amide-based solvents, and lactone-based solvents are preferred since solubility of the polyimide and the like is high and the composition viscosity and the like tend to become easy to handle in ordinary production equipments. One of these solvents may be used solely or two or more thereof may be used in any ratio and combination.

In order to increase reactivity of the starting materials of the tetracarboxylic dianhydride, the diamine compound, and the like, an organic amine compound may be used as a catalyst. As the organic amine compound, there may be mentioned tertiary alkylamines such as trimethylamine, triethylamine, tripropylamine, and tributylamine; alkanolamines such as triethanolamine, N,N-dimethylethanolamine, and N,N-diethylethanolamine; alkylenediamines such as triethylenediamine; pyridines such as pyridine; pyrrolidines such as N-methylpyrrolidine and N-ethylpyrrolidine; piperidines such as N-methylpiperidine and N-ethylpiperidine; imidazoles such as imidazole; quinolines such as quinoline and isoquinoline; and the like. One of these may be used solely or two or more thereof may be used in any ratio and combination.

The obtained polyimide or polyamic acid may be added with the following polymer having a heterocyclic ring at a side chain and may be used as it is as a varnish or may be added into a poor solvent and thereby precipitated in a solid form to be obtained as a polyimide or polyamic acid (polyimide precursor) composition.

The poor solvent to be used is not particularly limited and can be appropriately selected depending on the kind of the polyimide or polyimide precursor but there may be mentioned ether-based solvents such as diethyl ether and diisopropyl ether; ketone-based solvents such as acetone, methyl ethyl ketone, isobutyl ketone, and methyl isobutyl ketone; alcohol-based solvents such as methanol, ethanol, and isopropyl alcohol; and the like. Of these, alcohol-based solvents such as methanol and isopropyl alcohol are preferred since a precipitate is efficiently obtained and there is a tendency that the boiling point is low and drying becomes easy. One of these solvents may be used solely or two or more thereof may be used in any ratio and combination.

The polyimide or polyamic acid obtained by precipitation with a poor solvent can be re-dissolved in a solvent and used as a polyimide varnish or a polyamic acid varnish.

<Glass Transition Temperature (Tg)>

The polyimide resin for use in the invention has a glass transition temperature (Tg) by a DMS method (dynamic thermomechanometry apparatus) of preferably 250° C. or higher, more preferably 260° C. or higher, further preferably 270° C. or higher, particularly preferably 280° C. or higher. The glass transition temperature is preferably the above lower limit value or higher from the viewpoint of heat resistance. On the other hand, an upper limit of the glass transition temperature (Tg) is not particularly limited but is usually 400° C. or lower and there is a resin having no Tg. Incidentally, the glass transition temperature (Tg) by the DMS method can be measured by the method described in Examples to be mentioned later.

[Other Components]

From the viewpoint of imparting coatability, processing characteristics, various functions, and the like, the composition of the invention may contain surfactants, deforming agents, colorants such as organic pigments, antioxidants, ultraviolet absorbents, stabilizers such as hindered amine-based stabilizers, antistatic agents, lubricants, antistatic agents, flame retardants, plasticizers, releasing agents, leveling agents, and the like. Also, it may contain the other resins, inorganic fillers, or organic fillers within the range where the purpose of the invention is not impaired.

Examples of the inorganic fillers include inorganic oxides such as silica, diatomaceous earth, beryllium oxide, pumice, and pumice balloon; hydroxides such as aluminum hydroxide and magnesium hydroxide; metal carbonate salts such as calcium carbonate, magnesium carbonate, basic magnesium carbonate, dolomite, and dowsonite; metal sulfate salts and sulfite salts such as calcium sulfate, barium sulfate, ammonium sulfate, and calcium sulfite; silicate salts such as talc, clay, mica, asbestos, glass fibers, glass balloons, glass beads, calcium silicate, montmorillonite, and bentonite; powdery, particulate, tabular, or fibrous inorganic fillers such as molybdenum sulfide, zinc borate, barium metaborate, calcium borate, sodium borate, and boron fibers; powdery, particulate, fibrous, or whisker-like ceramic fillers such as silicon carbide, silicon nitride, zirconia, aluminum nitride, titanium carbide, and potassium titanate; and the like.

Examples of the organic fillers include husk fibers such as chaff, wood flour, cotton, jute, paper strips, cellophane strips, aromatic polyamide fibers, cellulose fibers, nylon fibers, polyester ester fibers, polypropylene fibers, thermosetting resin powder, rubber, and the like.

As the fillers, those processed into flat plates such as non-woven fabrics may be used or a plurality of materials may be used in combination.

These various fillers and additive components may be added at any stage of any step in the production of the composition of the invention.

Of the other components, when the leveling agent is contained, smoothness of the polyimide film to be formed tends to be improved, so that the case is preferred. As the leveling agent, for example, silicone-based compounds and the like may be mentioned. The silicone-based compounds are not particularly limited and examples thereof include polyether-modified siloxanes, polyether-modified polydimethylsiloxanes, polyether-modified hydroxyl group-containing polydimethylsiloxanes, polyether-modified polymethylalkylsiloxanes, polyester-modified polydimethylsiloxanes, polyester-modified hydroxyl group-containing polydimethylsiloxanes, polyester-modified polymetylalkylsiloxanes, aralkyl-modified polymethylalkylsiloxane, highly polymerized silicones, amino-modified silicones, amino derivative silicones, phenyl-modified silicones, polyether-modified silicones, and the like.

[Polymer Having Heterocyclic Ring at Side Chain]

The polymer having a heterocyclic ring at a side chain for use in the invention is usually a polymer of a heterocyclic compound having a vinyl group and may be a homopolymer (homopolymerization product) or a copolymer.

As the heterocyclic compound having a vinyl group that is a monomer component composing the polymer having a heterocyclic ring at a side chain, there may be mentioned vinylpyrrolidone, vinylpyridine, vinylpyrrole, vinylporphyrin, vinylindole, vinylphthalimide, vinylthiophene, and the like but heterocyclic compounds containing a nitrogen atom are preferred since they are excellent in compatibility to the polyimide resin and the like. Moreover, 5-membered and/or 6-membered heterocyclic compounds are preferred from the viewpoint of solubility in a solvent.

As the homopolymers derived from these heterocyclic compounds, there may be mentioned polyvinylpyrrolidone, polyvinylpyridine, polyvinylpyrrole, polyvinylporphyrin, polyvinylindole, polyvinylphthalimide, polyvinylthiophene, and the like.

The polymer having a heterocyclic ring at a side chain may be a copolymer of two or more kinds of the heterocyclic compounds having a vinyl group or a copolymer of one or two or more kinds of the heterocyclic compounds having a vinyl group and one or two or more kinds of the other vinylic monomers. As the copolymer of the heterocyclic compound having a vinyl group and the other vinylic monomer, there may be mentioned polyvinylpyridine-polystyrene copolymers, polyvinylpyrrolidone-polyvinyl alcohol copolymers, and the like.

Particularly, the polymer having a heterocyclic ring at a side chain is preferably one where the heterocyclic ring is composed of a nitrogen atom and a carbon atom, preferably polyvinylpyrrolidone, polyvinylpyridine, or a copolymer using vinylpyrrolidone and/or vinylpyridine as a copolymerization component, and especially preferably polyvinylpyrrolidone or polyvinylpyridine. The copolymer using vinylpyrrolidone and/or vinylpyridine as a copolymerization component preferably contains structural unit(s) derived from vinylpyrrolidone and/or vinylpyridine in a ratio of 50% by mol or more relative to the total structural units derived from the monomers composing the copolymer.

The polymer having a heterocyclic ring at a side chain for use in the invention is preferably one having a molecular weight of 5,000 to 2,000,000, more preferably one having a molecular weight of 10,000 to 2,000,000, further preferably one having a molecular weight of 20,000 to 1,800,000, and particularly preferably one having a molecular weight of 30,000 to 1,500,000. When the molecular weight is 10,000 or less, particularly 5,000 or less, the polymer easily coordinates between the molecules of the polyimide resin but when the molecular weight is less than 10,000, particularly less than 5,000, in the case of coordination between the molecules of the polyimide resin, the function of weakening the intermolecular force of the polyimide becomes insufficient in some cases. Incidentally, the "molecular weight" herein is weight-average molecular weight (Mw) and is a value in terms of polystyrene, which is measured on a gel permeation chromatograph (GPC).

One of these polymers having a heterocyclic ring at a side chain may be used solely or two or more thereof may be used in any ratio and combination.

The composition of the invention contains the polymer having a heterocyclic ring at a side chain in an amount of 0.1 to 7 parts by weight relative to 100 parts by weight of the aforementioned polyimide resin. When the content of the polymer having a heterocyclic ring at a side chain is less than 0.1 parts by weight relative to 100 parts by weight of the polyimide resin, the effect of improving bending resistance caused by blending the polymer having a heterocyclic ring at a side chain can be not sufficiently obtained. When the content exceeds 7 parts by weight, the molecule of the polymer having a heterocyclic ring at a side chain is prone to be cleaved by the heat at the time of enamel wire processing and the like, so that there is a possibility that objective bending resistance is not obtained.

The content of the polymer having a heterocyclic ring at a side chain in the composition of the invention is preferably 0.5 to 5 parts by weight relative to 100 parts by weight of the polyimide resin.

The composition of the invention containing the polymer having a heterocyclic ring at a side chain is produced by mixing the polyimide resin or the like, i.e., the polyimide precursor (polyamic acid) or the polyimide resin with the polymer having a heterocyclic ring at a side chain.

Incidentally, the concentration of the polyimide precursor (polyamic acid) or the polyimide resin in the composition of the invention is not particularly limited but, from the viewpoints of productivity of the composition, handling ability at use thereafter, film-forming properties, surface smoothness at film formation, and the like, the concentration is usually 3% by weight or more, preferably 5% by weight or more, more preferably 7% by weight or more and usually 80% by weight or less, preferably 60% by weight or less, more preferably 50% by weight or less, further preferably 45% by weight or less.

The concentration of the polyimide precursor (polyamic acid) or the polyimide resin in the composition can be confirmed using a conventionally known method as needed. For example, it can be determined by removing the solvent of the composition and the other component(s) by distillation using a method such as drying under reduced pressure and measuring the weight ratio before and after the removal by distillation.

[Use Applications]

Use applications of the composition of the invention are not particularly limited but, owing to high heat resistance, bending resistance, and abrasion resistance thereof, it can be used for insulating coating materials, metal coating materials for metal wires and metal plates, polyimide films, polyimide laminates, and the like and is particularly suitable for insulating coating materials. Incidentally, insulation means to cut off the current so that it does not flow into peripheral parts or conductors.

In any use applications, the composition of the invention is usually provided to various use applications after it is formed into a film on a substrate.

The method for forming a film using the composition of the invention is not particularly limited but a method of applying it onto a substrate or the like may be mentioned.

As methods for application, there may be mentioned die coating, spin coating, dip coating, screen printing, spraying, a casting method, a method of using a coater, an application method by spraying, a dipping method, a calendaring method, a casting method, and the like. These methods can be appropriately selected depending on application area, the shape to be applied, and the like.

The method for vaporizing the solvent contained in the film formed by application or the like is also not particularly limited. Usually, the solvent is vaporized by heating a carrier substrate on which the composition is applied. The heating method is not particularly limited and there may be, for example, mentioned hot-air heating, vacuum heating, infrared heating, microwave heating, contact heating using a hot plate, a hot roll, or the like, and the like.

As heating temperature in the above cases, a suitable temperature can be used according to the kind of the solvent. The heating temperature is usually 40° C. or higher, preferably 100° C. or higher, further preferably 200° C. or higher, particularly preferably 300° C. or higher and usually 1,000° C. or lower, preferably 700° C. or lower, further preferably 600° C. or lower, particularly preferably 500° C. or lower. The case where the heating temperature is 40° C. or higher is preferred since the solvent is thoroughly vaporized. Moreover, in the case where the heating temperature is 300° C. or higher, since the imidization reaction proceeds rapidly, baking for a short time is possible. Furthermore, the atmosphere at heating may be under air or under an inert atmosphere and is not particularly limited but, in the case where colorlessness and transparency are required for the polyimide, in order to suppress coloration, it is preferred to perform heating under an inert atmosphere of nitrogen or the like.

<Polyimide Film>

In the case where a polyimide film is formed using the composition of the invention and used, the thickness of the polyimide film is usually 1 μm or more, preferably 2 μm or more and usually 300 μm or less, preferably 200 μm or less. When the thickness thereof is 1 μm or more, the polyimide film becomes a self-supporting film having sufficient strength and handling properties tend to be improved. Moreover, by controlling the thickness to 300 μm or less, uniformity of the film tends to be easily secured.

The performance required for the polyimide film depends on use applications but it is preferred to have the following mechanical strength.

The tensile modulus of the polyimide film is not particularly limited but, from the viewpoint of abrasion resistance, it is preferably 2,000 MPa or more, more preferably 2,500 MPa or more, further preferably 3,000 MPa or more, and particularly preferably 3,500 MPa or more. On the other hand, from the viewpoint of bending resistance, it is preferably 10 GPa or less, more preferably 5,000 MPa or less.

Moreover, tensile elongation is not particularly limited but, from the viewpoint of bending resistance, preferably 20% or more, more preferably 30% or less, further preferably 50% or more and, from the viewpoint of bending followability, an upper limit is not particularly determined and higher elongation is more preferred.

When the polyimide film has both of such tensile modulus and tensile elongation, high elastic modulus and high elongation are both achieved and it is suitably used in various use applications such as surface protecting layers, substrates for devices, insulating films, or wiring films. Moreover, when it satisfies such tensile modulus and tensile elongation at the time when it is formed into a film, even in the use application as the metal coating material to be mentioned later, for example, it satisfies bending resistance and abrasion resistance that meet the requirements of miniaturization and an increase in output of recent motors.

The polyimide film derived from the composition of the invention can be obtained, for example, as mentioned above, by applying the composition of the invention on a support, subsequently heating it, and peeling the film from the support.

The method of peeling the polyimide film from the support is not particularly limited but, in view of capability of being peeled without impairing the performance of the film or the like, a method of physical peeling and a method of peeling by laser are preferred.

Examples of the method of physical peeling include a method of cutting off the peripheral edge of the laminate composed of the polyimide film/the support to obtain the polyimide film, a method of sucking the peripheral edge to obtain the polyimide film, a method of fixing the peripheral edge and migrating the supporting substrate to obtain the polyimide film, and the like.

<Polyimide Laminate>

As mentioned above, after the composition of the invention is applied on the substrate, it is heated to form a polyimide film on the substrate, the film is integrated with the substrate as it is without peeling, and thus a polyimide laminate can be formed.

The substrate is preferably hard and has heat resistance. Namely, it is preferred to use a material which is not deformed under the temperature condition that is required in the production process. Specifically, the substrate is preferably composed of a material having a grass transition temperature of usually 200° C. or higher, preferably 250° C. or higher. Examples of such a substrate include glass, ceramics, metals, silicon wafers, and the like.

In the case where glass is used as the substrate, the glass to be used is not particularly limited and examples thereof include blue sheet glass (alkali glass), high silicate glass, soda-lime glass, lead glass, aluminoborosilicate glass, alkali-free glass (borosilicate glass, Eagle XG manufactured by Corning, etc.), aluminosilicate glass, and the like.

In the case where a metal is used as the substrate, the metal to be used is not particularly limited and example thereof include gold, silver, copper, aluminum, iron, and the like. Various alloys thereof may be used.

<Metal Coating Material>

The metal coating material of the invention has a resin layer comprising the above composition of the invention. Particularly, owing to high heat resistance and bending resistance and also abrasion resistance thereof, it can be suitably used as an enamel coating material or the like of insulating coating materials for electric wires and cables, low-temperature storage tanks, space heat insulating materials, integrated circuits, or the like.

The kind of the metal to be coated with the composition of the invention is not particularly limited and examples thereof include gold, silver, copper, aluminum, iron, and an alloy containing one or two or more of the metals.

The resin coating layer comprising the composition of the invention can be formed in the same manner as in the aforementioned method for forming the polyimide film and is usually formed in a thickness of about 1 to 200 μm.

EXAMPLES

Hereinafter, the present invention is explained in further detail with reference to Examples but the invention should not be construed as being limited to the following Examples unless it exceeds the gist thereof. Incidentally, the values of various production conditions and evaluation results in the following Examples have meanings as preferable values of upper limits or lower limits in the embodiments of the invention, and preferable ranges may be ranges defined by combinations of values of the above-described upper limits or lower limits and values of the following Examples or values of certain Examples and values of other Examples.

[Evaluation Methods]

The polyimide resins and polyimide resin compositions obtained in the following Examples and Comparative Examples were evaluated by the following methods.

[Bending Resistance (Tensile Strength) and Abrasion Resistance (Tensile Modulus)]

Examples and Comparative Examples of Preferable Embodiment 1

In accordance with JIS K6301, a specimen of a polyimide film shaped into a strip having a width of 10 mm, a length of 80 mm, and a thickness of about 30 μm was subjected to a tensile test at a distance between chucks of 50 mm and a tensile rate of 10 mm/minute using a tensile tester [product name "Tensilon UTM-polyimide resin-100" manufactured by ORIENTEC CORPORATION] to prepare a stress-strain curve, thus determining a tensile modulus (MPa). Also, an elongation percentage was measured at the point when the specimen was broken, thus determining tensile elongation. The larger the tensile modulus is, the more excellent the abrasion resistance is. Moreover, it is evaluated as follows: the larger the tensile elongation is, the more excellent the flexibility is and the more excellent the bending resistance (bending followability) is.

Examples and Comparative Examples of Preferable Embodiment 2

The tensile modulus and tensile elongation were measured in the same manner as in the above measurement of the tensile modulus and tensile elongation of Examples and Comparative Examples of the preferable embodiment 1 except that the thickness of the polyimide film was changed to the thickness shown in Table-2 to be described later.

[Heat Resistance (Glass Transition Temperature)]

Using a dynamic thermomechanometry apparatus (DMS/SS6100 manufactured by SII Nano Technology Inc.), storage modulus and loss modulus of a sample against vibration load of the sample were measured under the following measurement conditions and glass transition temperature (Tg) was determined from loss tangent. The glass transition temperature (Tg) corresponds to the glass transition temperature (Tg) of the polyimide resin and the sample was evaluated as follows: the higher the Tg is, the more excellent the heat resistance is.

(Measurement Conditions of DMS)

A peak top of loss tangent (tan δ) obtained by dividing the storage modulus (E') of a specimen of a polyimide film by loss modulus (E") was defined as glass transition temperature.

Measured temperature range: 50° C. to 400° C. (temperature-raising rate: 3° C./min)

Tensile weight: 5 g

Shape of specimen: 10 mm×10 mm

[Starting Materials to be Used]

The starting materials for the production of the polyimide resin compositions of Examples and Comparative Examples are as followed.

3,3',4,4'-Biphenyltetracarboxylic dianhydride (BPDA): manufactured by Mitsubishi Chemical Corporation 4,4'-Diaminodiphenyl ether (ODA): manufactured by Wakayama Seika Kogyo Co., Ltd.

4,4'-Bis(4-aminophenoxy)biphenyl (BODA): manufactured by Wakayama Seika Kogyo Co., Ltd.

4,4'-Diaminobenzanilide (DABA): manufactured by Wakayama Seika Kogyo Co., Ltd.

N,N-Dimethylacetamide (DMAc): manufactured by Mitsubishi Gas Chemical Company Inc.

Polyvinylpyrrolidone K-30 (PVP K-30): DKS Co., Ltd.
Polyvinylpyrrolidone K-50 (PVP K-50): DKS Co., Ltd.
Polyvinylpyrrolidone K-85 (PVP K-85): DKS Co., Ltd.
Polyvinylpyrrolidone K-90 (PVP K-90): DKS Co., Ltd.
Poly(4-vinylpyridine-co-styrene) (PVPy-St): Tokyo Chemical Industry Co., Ltd.

Synthetic Examples, Examples, and Comparative Examples of Preferable Embodiment 1

[Synthesis of Polyimide Precursor]

Synthetic Example 1

To a four-necked flask equipped with a nitrogen gas-inlet tube, a cooler, and a stirrer were added 53.0 parts by weight of BPDA, 37.2 parts by weight of ODA, and 411 parts by weight of DMAc. The mixture was heated while stirring and reacted at 80° C. for 6 hours to obtain a polyimide precursor 1 having a solid matter concentration of 18% by weight.

Synthetic Example 2

To a four-necked flask equipped with a nitrogen gas-inlet tube, a cooler, and a stirrer were added 41.2 parts by weight of BPDA, 53.7 parts by weight of BODA, and 432 parts by weight of DMAc. The mixture was heated while stirring and reacted at 80° C. for 6 hours to obtain a polyimide precursor 2 having a solid matter concentration of 18% by weight.

[Preparation of Coating Solution]

According to the blend composition shown in Table-1, polyamic acid varnishes PI-1 to PI-11 (for Examples) and PI-12 to PI-16 (for Comparative Examples) were prepared. Incidentally, the amount of varnish to be used shown in Table-1 is shown in terms of % by weight as solid matter.

[Manufacture of Polyimide Film]

Each of the polyamic acid varnishes PI-1 to PI-16 was applied on a glass plate using an applicator of 500 μm and, after the resultant was heated and cured for 30 minutes in a hot-air drying furnace at 350° C., a laminate of glass plate-polyimide was taken out of the drying furnace. After the laminate was allowed to cool to room temperature, the laminate was immersed in a hot water at 90° C. to peel the film from the glass. Subsequently, the film was dried in an inert drying machine at 100° C. for 60 minutes, thereby obtaining a polyimide film having a thickness shown in Table-1.

Evaluation results of the obtained polyimide films are shown in Table 1.

TABLE 1

| | | Polyamic acid varnish | | | | | | |
| --- | --- | --- | --- | --- | --- | --- | --- | --- |
| | | Polyimide precursor | | Polymer having heterocyclic ring at side chain | | Evaluation results | | |
| | Kind | Composition | Amount [parts by weight] | Kind | Amount [parts by weight] | Film thickness [μm] | Tensile modulus [MPa] | Tensile elongation [%] | Tg [° C.] |
| Example 1 | PI-1 | BPDA/ODA | 100 | PVP K-30 | 0.5 | 32 | 3322 | 69 | 284 |
| Example 2 | PI-2 | BPDA/ODA | 100 | PVP K-50 | 2 | 31 | 3116 | 64 | 284 |
| Example 3 | PI-3 | BPDA/ODA | 100 | PVP K-85 | 2 | 28 | 3368 | 38 | 284 |
| Example 4 | PI-4 | BPDA/ODA | 100 | PVP K-90 | 3 | 31 | 3106 | 56 | 284 |
| Example 5 | PI-5 | BPDA/ODA | 100 | PVP K-90 | 5 | 30 | 3182 | 47 | 284 |
| Example 6 | PI-6 | BPDA/ODA | 100 | PVPy-ST | 2 | 29 | 3259 | 35 | 284 |
| Example 7 | PI-7 | BPDA/BODA | 100 | PVP K-30 | 0.5 | 32 | 3110 | 38 | 276 |
| Example 8 | PI-8 | BPDA/BODA | 100 | PVP K-30 | 1 | 31 | 3155 | 36 | 276 |
| Example 9 | PI-9 | BPDA/BODA | 100 | PVP K-30 | 5 | 30 | 3187 | 38 | 276 |
| Example 10 | PI-10 | BPDA/BODA | 100 | PVP K-90 | 1 | 36 | 3008 | 76 | 276 |
| Example 11 | PI-11 | BPDA/BODA | 100 | PVP K-90 | 2 | 31 | 2990 | 40 | 276 |
| Comparative Example 1 | PI-12 | BPDA/ODA | 100 | — | 0 | 29 | 3593 | 28 | 284 |
| Comparative Example 2 | PI-13 | BPDA/BODA | 100 | — | 0 | 27 | 3050 | 29 | 276 |
| Comparative Example 3 | PI-14 | BPDA/ODA | 100 | PVP K-90 | 10 | 29 | 3234 | 11 | 284 |
| Comparative Example 4 | PI-15 | BPDA/BODA | 100 | PVP K-30 | 10 | 32 | 2959 | 12 | 276 |
| Comparative Example 5 | PI-16 | BPDA/BODA | 100 | PVP K-90 | 10 | 27 | 3211 | 19 | 276 |

* "—" in Table-1 shows that a polymer having a heterocyclic ring at a side chain is not added.

Synthetic Examples and Examples of Preferable Embodiment 2

Synthetic Example 3

To a four-necked flask equipped with a nitrogen gas-inlet tube, a cooler, and a stirrer were added 59.0 parts by weight of BPDA, 38.6 parts by weight of ODA, 2.3 parts by weight of DABA, and 403 parts by weight of DMAc. The mixture was heated while stirring and reacted at 80° C. for 6 hours to obtain a polyimide precursor 3 having a solid matter concentration of 18% by weight.

The polyimide precursor 3 is one obtained by reacting 100 mol % of BPDA with 95 mol % of ODA and 5.0 mol % of DABA and thus the introduction amount of DABA that is an introduction amount of a hydrogen bond-forming monomer is 2.5 mol %.

Synthetic Examples 4 to 6

Polyimide precursors 4, 5, and 6 were obtained by carrying out a reaction in the same manner as in Synthetic Example 3 except that the amounts of DABA and ODA to be used were changed so that the introduction amount of DABA became 10 mol %, 25 mol %, and 30 mol %, respectively.

[Preparation of Coating Solution]

According to the blend composition shown in Table-2, polyamic acid varnishes PI-17 to PI-20 (for Examples) were prepared. Incidentally, the amount of varnish to be used shown in Table-2 is shown in terms of % by weight as solid matter.

[Manufacture of Polyimide Film]

Each of the polyamic acid varnishes PI-17 to PI-20 was applied on a glass plate using a spin coater and, after the resultant was heated and cured for 30 minutes in a hot-air drying furnace at 350° C., a laminate of glass plate-polyimide was taken out of the drying furnace. After the laminate was allowed to cool to room temperature, the laminate was immersed in a hot water at 90° C. to peel the film from the glass. Subsequently, the film was dried in an inert drying machine at 100° C. for 60 minutes, thereby obtaining a polyimide film having a thickness shown in Table-2.

Evaluation results of the obtained polyimide films are shown in Table-2.

TABLE 2

| | | Polyamic acid varnish | | | | | | | | |
| --- | --- | --- | --- | --- | --- | --- | --- | --- | --- | --- |
| | | Polyimide precursor | | | Polymer having heterocyclic ring at side chain | | Evaluation results | | | |
| | Kind | Composition | Introduction amount of DABA [mol %] | Amount [parts by weight] | Kind | Amount [parts by weight] | Film thickness [μm] | Tensile modulus [MPa] | Tensile elongation [%] | Tg [° C.] |
| Example 12 | PI-17 | BPDA/ODA/DABA | 5 | 100 | PVP K-30 | 0.5 | 15 | 4013 | 78 | 289 |
| Example 13 | PI-18 | BPDA/ODA/DABA | 10 | 100 | PVP K-30 | 0.5 | 18 | 3885 | 117 | 284 |

TABLE 2-continued

| | | Polyamic acid varnish | | | | | | | |
| | | Polyimide precursor | | Polymer having heterocyclic ring at side chain | | | Evaluation results | | |
| | Kind | Composition | Introduction amount of DABA [mol %] | Amount [parts by weight] | Kind | Amount [parts by weight] | Film thickness [μm] | Tensile modulus [MPa] | Tensile elongation [%] | Tg [° C.] |
|---|---|---|---|---|---|---|---|---|---|---|
| Example 14 | PI-19 | BPDA/ODA/DABA | 25 | 100 | PVP K-30 | 0.5 | 10 | 4956 | 45 | 301 |
| Example 15 | PI-20 | BPDA/ODA/DABA | 30 | 100 | PVP K-30 | 0.5 | 22 | 3748 | 58 | 304 |

As apparent from Table-1 and Table-2, the polyimide films of Examples in which a polymer having a heterocyclic ring at a side chain is added within the range of the present invention have high heat resistance and also have large tensile elongation and excellent bending resistance. Particularly, in Examples 12 to 15 of Table-2 in which the preferable embodiment 2 is adopted, it is realized that tensile modulus is large and thus abrasion resistance is excellent.

On the other hand, in Comparative Examples 1 and 2 in which a polymer having a heterocyclic ring at a side chain is not added, tensile elongation is small and thus bending followability is poor. In Comparative Examples 3 to 5 in which the addition amount of a polymer having a heterocyclic ring at a side chain is too large, tensile elongation rather decreases and it is realized that bending resistance is impaired.

While the invention has been described in detail and with reference to specific embodiments thereof, it will be apparent to one skilled in the art that various changes and modifications can be made therein without departing from the spirit and scope thereof.

The present application is based on Japanese Patent Application No. 2016-74346 filed on Apr. 1, 2016, and the contents are incorporated herein by reference.

The invention claimed is:

1. A resin composition for insulating coating material, comprising: a polyimide resin and/or a polyamic acid thereof; and a polymer having a heterocyclic ring at a side chain, wherein the content of the polymer having a heterocyclic ring at a side chain is 0.1 to 7 parts by weight relative to 100 parts by weight of the polyimide resin and/or the polyamic acid thereof,
where the polymer having a heterocyclic ring at a side chain is one or two or more selected from the group consisting of polyvinylpyridine and copolymers containing vinylpyridine as a copolymerization component.

2. The resin composition for insulating coating material according to claim 1, wherein the glass transition temperature (Tg) of the polyimide resin and/or the polyamic acid thereof is 250 to 400° C.

3. The resin composition for insulating coating material according to claim 1, wherein the polyimide resin and/or the polyamic acid thereof contains at least one of a structural unit represented by the following formula (1) and a structural unit represented by the following formula (2):

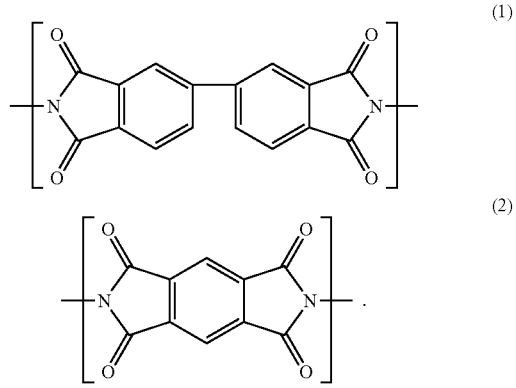

4. The resin composition for insulating coating material according to claim 1, wherein the polyimide resin and/or the polyamic acid thereof contains a structural unit represented by the following formula (3):

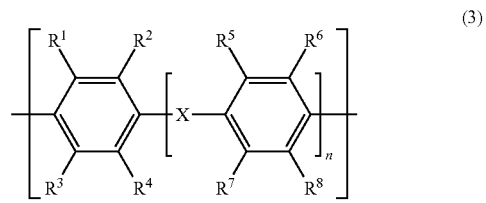

wherein $R^1$ to $R^8$ may be the same or different from one another and is a hydrogen atom, an alkyl group having 1 to 4 carbon atoms, a fluoroalkyl group having 1 to 4 carbon atoms, or a hydroxyl group; X is a direct bond, an oxygen atom, a sulfur atom, an alkylene group having 1 to 4 carbon atoms, a sulfonyl group, a sulfinyl group, a sulfide group, a carbonyl group, an amide group, an ester group, or a secondary amino group; and n is an integer of 0 to 4.

5. The resin composition for insulating coating material according to claim 4, wherein the polyimide resin contains the structural unit represented by the following formula (3) comprises any of the structural units represented by the following formulae (3-1) to (3-6):

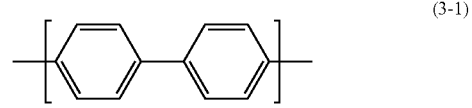

-continued (3-2)
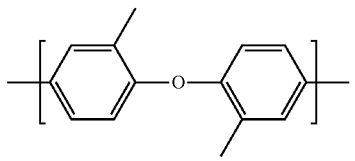

(3-3)
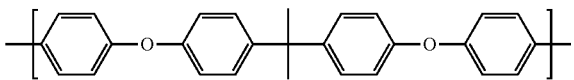

(3-4)
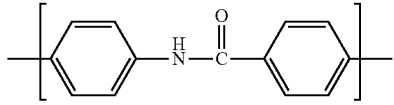

(3-5)
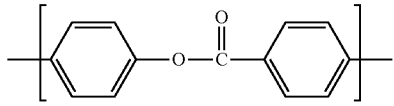

(3-6)
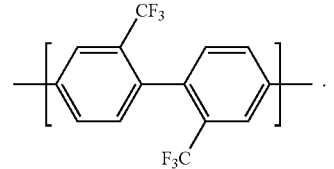

6. The resin composition for insulating coating material according to claim 1, wherein the polyimide resin and/or the polyamic acid thereof contains a repeating unit containing a structure represented by the following formula (5) and a repeating unit containing at least one structure selected from the group consisting of —NH—, =NH, —C(O)NH—, —NHC(O)O—, —NHC(O)NH—, —NHC(S)NH—, —NH$_2$, —OH, —C(O)OH, —SH, —C(O)N(OH)—, —(O)S(O)—, —C(O)—, and —C(O)SH:

(5)
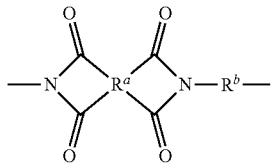

wherein R$^a$ represents a tetracarboxylic acid residue and R$^b$ represents a diamine residue.

7. The resin composition for insulating coating material according to claim 6, wherein the polyimide resin and/or the polyamic acid thereof contains the repeating unit containing a structure represented by the formula (5) and the repeating unit containing a —C(O)NH-structure.

8. The resin composition for insulating coating material according to claim 7, wherein the —C(O)NH— structure is a structure derived from 4,4'-diaminobenzanilide.

9. The resin composition for insulating coating material according to claim 1, wherein the polyimide resin and/or the polyamic acid thereof is blocked at the molecular end.

10. A metal coating material comprising at least a resin layer containing the resin composition for insulating coating material according to claim 1.

11. The resin composition for insulating coating material according to claim 1, wherein the polyimide resin and/or a polyamic acid thereof contains a structural unit represented by the following formula (1):

(1)
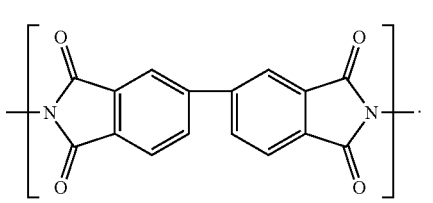

12. The resin composition for insulating coating material according to claim 1, wherein the content of the polymer having a heterocyclic ring at a side chain is 0.5 to 5 parts by weight relative to 100 parts by weight of the polyimide resin.

13. The resin composition for insulating coating material according to claim 1, wherein the polymer having a heterocyclic ring at a side chain has a molecular weight of 5,000 to 2,000,000.

14. The resin composition for insulating coating material according to claim 1, wherein the polymer having a heterocyclic ring at a side chain has a molecular weight of 30,000 to 1,500,000.

15. The resin composition for insulating coating material according to claim 1, wherein a concentration of the polyamic acid is 3% or more relative to 100 parts by weight of the resin composition.

16. The resin composition for insulating coating material according to claim 1, wherein a concentration of the polyamic acid is 80% or less relative to 100 parts by weight of the resin composition.

* * * * *